United States Patent
Kryukov et al.

(10) Patent No.: US 7,003,174 B2
(45) Date of Patent: Feb. 21, 2006

(54) REMOVAL OF BLOCK ENCODING ARTIFACTS

(75) Inventors: Sergei Nikolacevich Kryukov, Saint Petersburg (RU); Tatyana Olegovna Semenkova, Saint Petersburg (RU); Kryzstof Antoni Zaklika, Saint Paul, MN (US)

(73) Assignee: Corel Corporation, Ottawa (CA)

( * ) Notice: Subject to any disclaimer, the term of this patent is extended or adjusted under 35 U.S.C. 154(b) by 661 days.

(21) Appl. No.: 09/897,765

(22) Filed: Jul. 2, 2001

(65) Prior Publication Data

US 2003/0053708 A1 Mar. 20, 2003

(51) Int. Cl.
*G06K 9/40* (2006.01)

(52) U.S. Cl. .............. 382/266; 382/239; 382/275; 358/3.26; 358/3.27

(58) Field of Classification Search ........... 382/252, 382/260, 261, 262, 274, 275, 268, 269, 248, 382/243, 239; 358/512, 518, 519, 520, 1.2, 358/3.26, 3.27, 463, 3.21
See application file for complete search history.

(56) References Cited

U.S. PATENT DOCUMENTS

| | | | | |
|---|---|---|---|---|
| 4,707,786 A | * | 11/1987 | Dehner | 378/14 |
| 5,025,312 A | * | 6/1991 | Faroudja | 348/620 |
| 5,097,322 A | * | 3/1992 | Fairhurst | 348/665 |
| 5,150,432 A | * | 9/1992 | Ueno et al. | 382/250 |
| 5,208,596 A | * | 5/1993 | Dieterich | 341/144 |
| 5,367,385 A | | 11/1994 | Yuan | 358/465 |
| 5,454,051 A | * | 9/1995 | Smith | 382/233 |
| 5,495,538 A | | 2/1996 | Fan | 382/233 |
| 5,521,718 A | | 5/1996 | Eschbach | 358/432 |
| 5,734,757 A | | 3/1998 | Kim | 382/261 |
| 5,737,451 A | | 4/1998 | Gandhi et al. | 382/268 |
| 5,802,218 A | | 9/1998 | Brailean | 382/275 |
| 5,819,035 A | | 10/1998 | Devaney et al. | 395/200.32 |
| 5,850,294 A | | 12/1998 | Apostolopoulos et al. | 358/433 |
| 5,852,475 A | | 12/1998 | Gupta et al. | 348/606 |
| 5,883,983 A | | 3/1999 | Lee et al. | 382/268 |
| 5,920,356 A | | 7/1999 | Gupta et al. | 348/606 |
| 5,959,693 A | * | 9/1999 | Wu et al. | 348/624 |

(Continued)

FOREIGN PATENT DOCUMENTS

EP 0 808 068 A2 11/1997

(Continued)

OTHER PUBLICATIONS

Wallace, G. K., "The JPEG Still Picture Compression Standard," *Communications of the ACM* vol. 34(4) Apr. 1991; 31-44.

(Continued)

*Primary Examiner*—Kanjibhai Patel
*Assistant Examiner*—Yosef Kassa
(74) *Attorney, Agent, or Firm*—Hensley Kim & Edgington, LLC

(57) ABSTRACT

A method of reducing artifacts in an image previously processed by block transform encoding may comprise the steps of:
  determining block boundaries;
  determining an approximate metric of artifact visibility;
  optionally interpolating across block boundaries;
  adaptively filtering luminance;
  optionally adaptively filtering chrominance;
  adaptively adjusting local saturation variation; and
  adaptively simulating high spatial frequency image detail;
wherein the adaptive steps are executed to an extent or in an amount depending on the metric or standard or measurement of artifact visibility.

18 Claims, 2 Drawing Sheets

U.S. PATENT DOCUMENTS

| | | | |
|---|---|---|---|
| 5,974,197 A | 10/1999 | Lee et al. | 382/268 |
| 6,115,503 A * | 9/2000 | Kaup | 382/268 |
| 6,151,420 A | 11/2000 | Wober et al. | 382/275 |
| 6,167,164 A | 12/2000 | Lee | 382/261 |
| 6,246,827 B1 * | 6/2001 | Strolle et al. | 386/33 |
| 6,539,060 B1 * | 3/2003 | Lee et al. | 375/240.29 |
| 6,728,414 B1 * | 4/2004 | Chang et al. | 382/254 |

FOREIGN PATENT DOCUMENTS

| | | |
|---|---|---|
| EP | 0 881 837 A1 | 12/1998 |
| EP | 0 884 911 A1 | 12/1998 |
| EP | 0 886 444 A2 | 12/1998 |
| EP | 0 998 146 A1 | 5/2000 |
| EP | 1 001 608 A2 | 5/2000 |
| JP | 11-298898 | 10/1999 |
| WO | WO97/01151 | 1/1997 |

OTHER PUBLICATIONS

Hu, J., et al., "Removal of Blocking and Ringing Artifacts in Transform Coded Images," *IEEE Transactions on Consumer Electronics*, vol. 4, 1997; 2565-2568.

Itoh, Y., "Detail-preserving Noise Filtering Using Binary Index," *SPIE* vol. 2666, 1996; 119-130.

Datcu, M., et al., "Histogram Analysis of JPEG Compressed Images as an Aid in Image Deblocking," *Proc. DCC '95 Data Compress. Conf.*, 1995; 425.

Castagno, R., et al., "A Rational Filter for the Removal of Blocking Artifacts in Image Sequences Coded at Low Bitrate," *Proc. VIII European Signal Processing Conference (EUSPICO)* 1999.

Castagno, R., et al., "A Simple Algorithm for the Reduction of Blocking Artifacts in Images and its Implementation," *IEEE Transactions on Consumer Electronics*, vol. 44(3) Aug. 1998; 1062-1070.

Smith, A.R., "Color Gamut Transform Pairs," *Computer Graphics*, vol. 12 (3) Aug. 1978; 12-19.

Ramponi, G., et al., "Interpolation of the DC Component of Coded Images Using a Rational Filter," Proc. $4^{th}$ *IEEE Int. Conf. Image Processing*, Apr. 21-24, 1997; 389-392.

Scognamiglio, G., et al., "Picture Enhancement in Video and Clock-coded Image Sequences," *IEEE Transactions on Consumer Electronics*, vol. 45(3), Aug. 1999; 680-689.

Inoue, A., et al., "Adaptive Quality Improvement Method for Color Images," *NEC Res. & Develop.*, vol. 35(2) Apr. 1994; 180-187.

* cited by examiner

REMOVAL OF BLOCK ENCODING ARTIFACTS

BACKGROUND OF THE INVENTION

1. Field of the Invention

The present invention relates to the field of imaging, particularly computer assisted imaging, the correction of computer assisted imaging, the correction of computer assisted imaging having image data that has been block transform encoded, and the removal of artifacts in the block transform encoded segments of the image.

2. Background of the Art

Images contain large volumes of information and the storage or transfer of the images and the information using telecommunication systems and computers consumes many resources. Accordingly, there has been much interest in image compression. Many of the compression schemes involve representing the image as encoded blocks and then compressing each of the encoded blocks or groups of encoded blocks. In other words, the image is divided into a collection of identically sized rectangles within which the image data is transformed to provide a sequence of coefficients that can be encoded with a different number of bits for each coefficient. The number of bits is selected to reduce the amount of redundant or near redundant data that is retained. Non-limiting examples of transforms that can be used for such encoding include the Fourier transform, the cosine transform, the Hadamard transform, or the Haar transform and other wavelet transforms. One of the most popular variants of transforms involves use of the discrete cosine transform (DCT) and is commonly known as "JPEG" after the Joint Photographic Experts Group (ISO/IEC JTC1 SC29 Working Group 1) that originated it. When associated with a file format, JPEG is called JFIF or SPIFF. JPEG is embodied in ISO Standard IS 10918-3. JPEG calls for subdividing the image into blocks, transforming the array of pixel values in each block according to the DCT so as to generate a plurality of coefficients, quantizing the coefficients for each block, and entropy encoding the quantized coefficients for each block. A particularly informative description can be found in G. K. Wallace, "The JPEG still picture compression standard", *Commun. ACM,* 34, 30 (1991). A related standard exists for video streams and is known as MPEG.

To achieve large amounts of compression, block transform coding is generally lossy, meaning that image information is permanently discarded during compression and the original image cannot be perfectly reconstructed from the compressed version. When the amount of compression is low, the loss of information is slight and unobjectionable. However, at higher compression levels, the information loss becomes increasingly apparent and is associated with the occurrence of visible artifacts relating to the block nature of the encoding and to the quantization of DCT coefficients. JPEG also tries to take advantage of human vision, which perceives less detail in color than in brightness, and so encodes chrominance in larger blocks than those used for luminance. This leads to additional artifacts at high compression. Artifacts can take any of several forms, including:

Block artifacts, where the outlines of the encoding blocks are superimposed on the image as distinct transitions from one block to another.

Ringing, which involves a spatial oscillation in brightness in the vicinity of sharp, high contrast edges such as occur with line art or text, or in photographs where bright areas are adjacent to dark ones.

Color leakage, where color spills beyond the boundaries of an object into the surroundings, an effect particularly prominent in objects containing saturated red colors.

Checkerboarding, a pixel-level pattern in the image superimposed on an individual encoded block, which can be especially objectionable in images containing smooth skin areas.

Artifacts, in other words elements in the compressed picture that were not present in the original, tend to be perceived as especially unpleasant. However, these artifacts are also accompanied by other defects that, while not strictly artifacts, are also the result of compression and contribute to reduced image quality, exacerbating the adverse effects of the artifacts. Examples of these additional effects include:

Desaturation, where the vividness of the original colors is reduced by sampling chrominance using larger blocks than for luminance, especially in areas that are small compared to the size of the encoding block.

Blurring or loss of sharpness as high frequency detail is increasing eliminated at higher compression levels.

Since information is discarded during compression, it generally is impossible to exactly restore the original image. However, it is, in principle, possible to improve its quality. Practitioners of the imaging art have been well aware of compression artifacts and there have been many attempts to reduce them. Most attempts, however, have been directed at removing only a single artifact, typically the block artifact. Other efforts include suppression of "mosquito noise", a phrase typically used to mean ringing, but the phrase is sometimes used as a catch-all name for ringing and color leakage. However, there remains a need for a method of comprehensively suppressing a range of different artifacts and defects.

One approach to ameliorating artifacts in, for example, MPEG encoded images, takes advantage of the temporal properties of the video stream. This procedure is illustrated by U.S. Pat. No. 5,852,475. Such methods are valueless for still imagery where there is no temporal information. A second approach to ameliorating artifacts has been to change the encoding and decoding algorithm or to transmit additional error correction information along with the image. This, however, is useless for coping with existing JPEG or other block encoded imagery. Another approach ameliorates artifacts by a post-processing that takes advantage of the DCT coefficients stored in the compressed file, as exemplified by U.S. Pat. No. 5,850,294 or U.S. Pat. No. 5,737,451. Many experienced users of images are aware of the lossy character of JPEG compression and immediately convert their images to non-lossy file formats to inhibit further image degradation during editing. In this case, the original file is lost and there is no further access to the DCT coefficients, rendering these methods useless as well. Other less experienced users edit JPEG compressed images and resave them in compressed form. This method is found to cause a situation where artifacts become increasing pronounced during the editing process and require suppression. However, after editing, the image is far removed from the original. Again, access to the discrete cosine transform (DCT) coefficients is impossible but, in this case, also irrelevant. Even the location of the image blocks cannot be taken for granted, since images are frequently cropped arbitrarily or resized. It is highly desirable, therefore, to have a method of artifact suppression that would be effective even under these adverse conditions and this is the concern of the present invention.

U.S. Pat. No. 5,367,385 discloses a seam filter for suppressing the visibility of block edges. The coefficients of the filter are selected based on the properties of the DCT coefficients, and the direction of the filter is selected in relation to the direction of image feature edges in the vicinity of block borders. U.S. Pat. No. 5,920,356 describes a post-processor for digital video that reduces blocking and mosquito noise artifacts. Pixels are classified into categories of image feature edge, block edge and shade area pixels and then are filtered with a spatially adaptive filter whose additional properties are determined from the encoding data. Preferably, the edge characteristics are supplemented by temporal information. U.S. Pat. No. 6,167,164 concerns a method for reduction of a blocking effect by unidirectional weighted filtering. The filter weights are derived from an edge map that is first thresholded using a threshold dependent on the DCT quantization step. The objective of WO 9841025 is to provide an adaptive filter that suppresses block edge artifacts without affecting image feature edges. The number of pixels included in the filtering depends on differences in pixel values across the block boundary and on the size of the quantization step of the DCT coefficients. U.S. Pat. No. 5,454,051 teaches improvement of image quality in a block transform encoded image by adaptively blurring in a way dependent on the coefficients of the transformed data. U.S. Pat. No. 5,495,538 discloses a means of JPEG image artifact reduction in which image blocks are segmented into uniform regions and smoothed. Subsequently the smoothed block is again subjected to DCT in order to guarantee that DCT coefficients will be within the initial quantization interval. A related patent, U.S. Pat. No. 5,521,718, also uses the technique filtering and then checking the result for plausibility against the original DCT coefficients. WO 0022834 describes blocking effect reduction by means of deriving both a local and a global blockiness measure along with estimation of signal to noise ratio from DCT quantization values. This information is used to control a de-blocking filter. U.S. Pat. No. 6,151,420 describes minimizing blocking artifacts by forming overlapping blocks that are filtered. The patent teaches a method of "stitching" the blocks in the region of overlap to improve image appearance. The specific filter disclosed is a Wiener filter applied in the domain of DCT coefficients. Eur. Pat. 808068 claims a method of removing a blocking effect comprising the steps of: extracting the boundary pixels of a current block and each adjacent block; forming difference values between the boundary pixels of the current block and the adjacent ones; calculating the mean of these differences and restricting this mean to within half a quantization step size; and adding this restricted mean to the boundary pixels of the current block. J. Hu, N. Sinaceur, F. Li and Z. Fan, "A simplified approach to reduce compression artifacts in transform coded images", *IEEE Internat. Conf. Acoustics, Speech and Signal Processing*, 4, 2565 (1997) present an algorithm with these main elements: block classification; boundary low-pass filtering and mid-point displacement interpolation; edge detection and filtering; and DCT constraint. The block classification is done in the DCT coefficient domain. In contrast to the present invention, all these publications depend on access to the original block transform coefficients.

Additional art of relevance to the present application can be found in these publications. U.S. Pat. No. 5,819,035 relates to removal of ringing artifacts in DCT coding and claims use of anisotropic diffusion filtering for this purpose for use in a video signal decoding system. U.S. Pat. No. 5,802,218 concerns reduction of mosquito and blocking artifacts in video. It uses a filter whose characteristics are determined by a signal variance, a predetermined noise variance and a predetermined autocorrelation coefficient. U.S. Pat. No. 5,883,983 describes filtering method for reducing blocking effects and ringing noise in which an edge map is formed from the image and the image is filtered. The filter properties depend on whether the area in the filter window is homogeneous or not as judged from the edge map, and if not the filter parameters are modified based on the edge map information. U.S. Pat. No. 5,974,197 teaches a closely related procedure. European Pat. 0 881 837 describes a procedure for reducing block coding artifacts by filtering, wherein the characteristics of the filter are determined using fuzzy logic. Input to the fuzzy logic decision unit is in the form of local and global block features computed with a Sobel edge-detecting filter. In Japanese Pat. 11-298898 a correlation value and direction between pixels is determined based on the direction of smallest signal difference between a pixel of interest and surrounding pixels. If the correlation value is below a threshold and the pixel is on a block boundary, it is low-pass filtered along the correlation direction. This procedure has the advantage that block distortion due to diagonal frequency components is prevented. European Pat. 0 886 444 claims a method of filtering a block encoded image comprising detecting a level of block distortion and filtering in dependence on the level of block distortion. The disclosure teaches estimation of block distortion using three pixels on either side of the block boundary and forming a ratio of the absolute differences across the block boundary to those within block boundaries in both adjacent blocks. This estimate is refined using temporal information from preceding and succeeding video frames. The visibility of the block boundary is suppressed with a one-dimensional averaging window in which the weights are chosen based on the block distortion measure. U.S. Pat. No. 5,734,757 discloses a post-processing method for improving block encoded images where a result image pixel is formed from an original image pixel or a filtered image pixel. The result contains pixels from the original image if the absolute difference between filtered and original pixel values is below a threshold, and from the filtered image otherwise. The filter is "a conventional low pass filter such as a median filter or a Laplacian filter". European Pat. 0 884 911 discloses a method of suppressing block boundaries in which a reference linear interpolation is established between two blocks across their mutual boundary and the intensities of pixels are adjusted towards this interpolation to an extent that depends on their distance from the block edge and on the activity within blocks. European Pat. 0 998 146 describes a method of block edge detection in the horizontal and vertical directions. In any given direction the image is high pass filtered and signal sums are accumulated in a perpendicular direction. The sum is a histogram of edge activity along one direction of the image. Peak positions within the histogram represent the locations of block boundaries (as shown in FIGS. 2 and 3 of the patent). In the best mode for carrying out the invention, the detection of peaks is described thus: "detecting part 18 detects three data higher in an accumulation/addition level in the selected detection region 119 as peak positions". What this actually means is unclear. For example, it is not evident whether the "accumulation/addition level" refers to the previous accumulation of sums to form the histogram or some action that is part of peak detection, though elsewhere the patent states "periodicity detecting means for detecting periodicity of the block noise in accordance with an accumulation/addition result outputted from the accumulating/adding means" clearly suggesting the former interpretation. Moreover, the use of the word "higher" in connection with peak detection implies some form of thresholding, with values higher than a threshold being taken as peaks. Subsequently the patent teaches binarization according to peak positions, which definitely implies thresholding. European Pat. 1 001 608 claims a method of detecting if an image is compressed. The method involves computing the absolute differences between neighboring pixels in an image, dividing these into groups that cross block boundaries and those that do not, and determining the presence of compression from the statistics of the two groups. The filter described by Y. Itoh, "Detail-preserving noise filtering using a binary index", *Proc. SPIE*, 2666, 119 (1996) is based on a binary heterogeneity index. Each pixel is classified into a high activity or a low activity group based on local statistics so that filtering can be restricted only to homogeneous regions. M. Datcu, G. Schwarz, K. Schmidt and C. Reck, "Histogram analysis of JPEG compressed images as an aid in image deblocking", *Proc. DCC '95 Data Compress. Conf*, 425 (1995) describe a measure of blocking effect, defined as the area of spikes to the total area of the image histogram. In R. Castagno and G. Ramponi, "A rational filter for the removal of blocking artifacts in image sequences coded at low bitrate", *Proc. VIII European Signal Processing Conference EUSIPCO*, 1, 567 (1996) there is presented a filter expressed as a ratio between a linear and a polynomial function of the image data. The filter is capable of changing its behavior from linear smoothing in uniform areas to nonlinear and directional filtering in textured areas. The use of this filter for reduction of blocking artifacts is described in R. Castagno, S. Marsi and G. Ramponi, "A simple algorithm for the reduction of blocking artifacts in images and its implementation", *IEEE Trans. Consumer Electronics*, 44, 1062 (1998).

SUMMARY OF THE INVENTION

The present invention provides a comprehensive method for reduction of artifacts in previously block transform encoded images. This is effected by providing a comprehensive method of artifact reduction in previously block transform encoded images that does require access to the transform domain data and that is adaptive to the amount of image degradation.

A method of reducing artifacts in an image previously processed by block transform encoding according to the invention may comprise the steps of:

determining block boundaries;

determining an approximate metric of artifact visibility;

optionally interpolating across block boundaries;

adaptively filtering luminance;

optionally adaptively filtering chrominance;

adaptively adjusting local saturation variation; and adaptively simulating high spatial frequency image detail;

wherein the adaptive steps are executed to an extent or in an amount depending on the said metric or standard or measurement of artifact visibility.

DETAILED DESCRIPTION OF THE INVENTION

Figure 1:
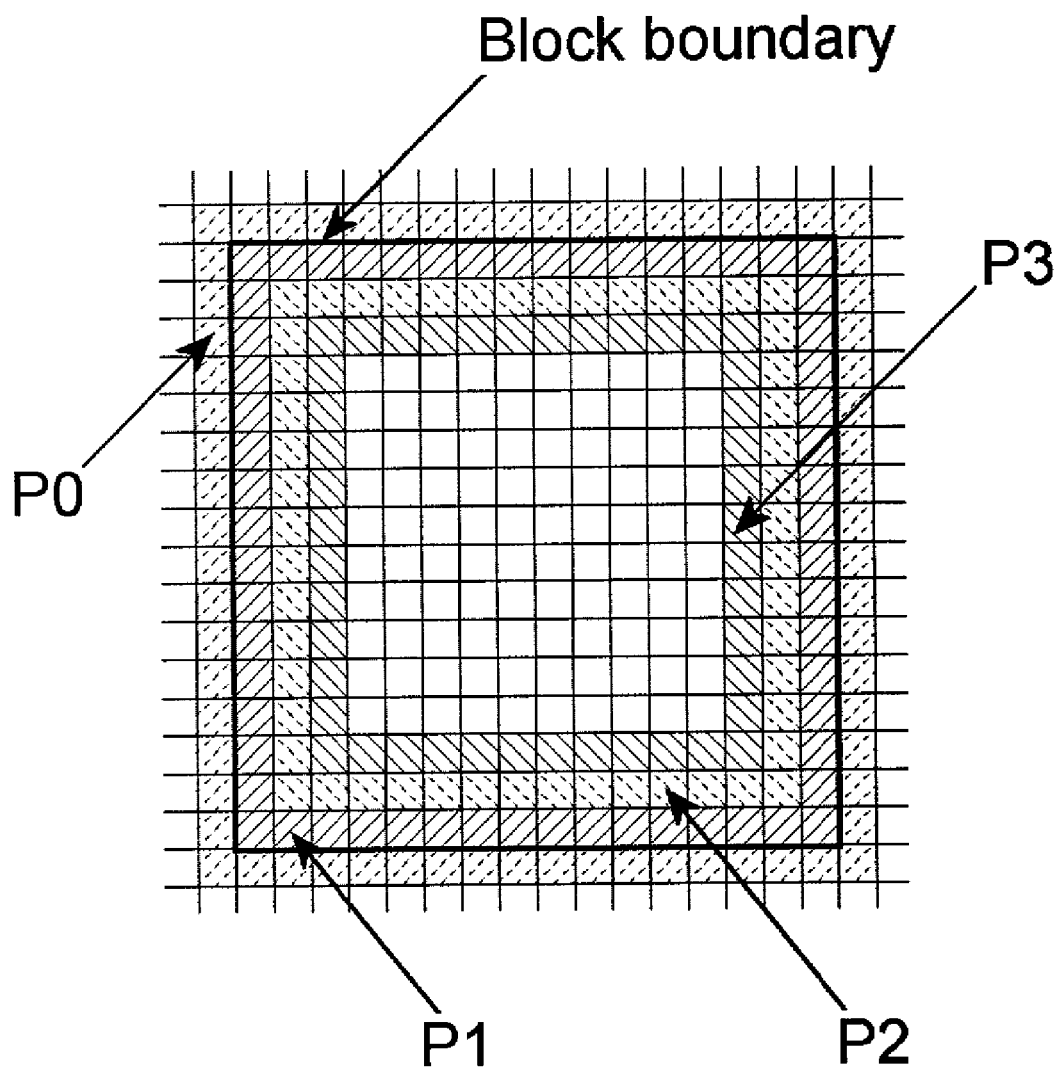
FIG. 1 shows a block boundary under consideration for adjustment.

The practice of this invention operates on digital images. A digital image comprises a collection of picture elements or pixels arranged on a regular grid. A gray scale image is represented by a channel of specific brightness values at individual pixel locations. Such a channel may also be represented as a color palette, for example containing 256 shades of gray. Gray scale images contain only achromatic colors, in other words those colors without a specific hue and with a zero saturation. A color image contains several channels, usual three or four, to describe the color at a pixel. For example, there may be red, green and blue (RGB) channels, or cyan, magenta, yellow and black (CMYK) channels. Each channel again contains brightness values representing the amount of color at each pixel. A color image may also be represented in palettized form. Such images contain chromatic colors, which possess both hue and saturation. The invention is concerned with both monochromatic images and color images that at some previous stage have been subjected to block transform encoding and may, in consequence, have been degraded in quality or acquired artifacts as described in the background of the invention. The most commonly encountered type of block transform encoding is that known as JPEG.

Whereas the color of an image may be represented in many ways, the block transform is usually performed in a color space in which one axis represents, at least approximately, the human perception of brightness. The invention is, therefore, practiced in such a color space. Examples of such color spaces include YIQ, YUV or YCbCr, the Xerox YES space, the Kodak PhotoYCC space, the Tektronix HVC (hue-value-chroma) color space, the HSV (hue-saturation-value) color space described by A. R. Smith, *Comput. Graph.*, 12, 12 (1978) and Lsa color space mentioned in WO 97/01151. Various computer graphics color spaces such as HLS (hue-lightness-saturation), HSL (hue-saturation-lightness), HSI (hue-saturation-intensity) or HSB (hue-saturation-brightness) may also be used. These spaces are described in J. Foley, A. van Dam, S. Feiner and J. Hughes, "Computer Graphics: Principles and Practice", Second Edition in C, Addison-Wesley, Reading, Mass., 1995. Since the computer color spaces tend to accord less well with human perception they are less desirable for the practice of the invention. Other color spaces may be perceptual color spaces, in which small color differences of the same perceptual size are represented by approximately the same numerical distance in the color space. Examples of such color spaces are color difference systems such as the CIE L*u*v* and CIE L*a*b* color spaces as described in G. Wyszecki and W. S. Stiles, "Color Science—Concepts and Methods, Quantitative Data and Formulae", Wiley, N.Y., 1982. Color appearance systems such as those described in M. D. Fairchild, "Color Appearance Models", Prentice-Hall, New York, 1998. However, the most preferred color spaces are those that are the native color spaces used in the block transform compression method. In the case of JPEG/JFIF compression, the color space is YCbCr.

For clarity, the invention will be described as a sequence of steps. It will be understood by those skilled in the art, however, that this is purely illustrative, and that the order of these steps may be changed and that steps may either be combined together to be performed in a single step or steps broken into multiple steps. The ordering of the step is guided only by logical necessity. For example, the last step in the process must be selected from among correcting the data, storing the data, or providing an image containing the data, but that other steps can be performed in various orders that do not alter the substantive effects of those steps. Within each step, wide variation is possible and, indeed, contemplated. However, a specific exemplary embodiment of each step is provided to enhance enablement, without that example being intended to define a functional or practical limitation on the practice of the invention. For example, although each example shows a specific color space, the practice of the present invention is clearly applicable and enabled to one skilled in the art for practice in any color space, particularly those specifically identified above. Equally, though the examples show certain specific artifact metrics, other such metrics may be used, including known prior art metrics. The overall process involves location of the boundaries of fixed size transform blocks and determining an artifact severity metric used to decide the details of subsequent individual algorithmic steps. Generally, these may include: elimination of block boundaries; adaptively filtering luminance; adaptively filtering chrominance; adaptively increasing local chrominance contrast; and adaptively simulating high frequency image detail.

The present invention may be generally described as a method of reducing artifacts in an image previously processed by block transform encoding comprising the steps of:
 determining block boundaries;
 determining an approximate metric of artifact visibility;
 adaptively filtering a property of the pixel, such as luminance;
 adaptively adjusting local saturation variation;
 adaptively simulating high spatial frequency image detail;

wherein the adaptive steps are executed to a degree or an amount dependent on the metric of artifact severity. The method may be practiced wherein prior to adaptively filtering the property of the image (such as luminance or the texture of luminance), the values (e.g., for luminance values) are interpolated across block boundaries. Additionally, in conjunction with adaptively filtering luminance, chrominance is adaptively filtered.

Another way of describing the method of the present invention is as a method of reducing artifacts in an image previously processed by block transform encoding comprising the steps of:
 determining block boundaries;
 determining an approximate metric of artifact visibility;
 adaptively filtering luminance with a filter;
 adaptively increasing local chrominance contrast;
 adaptively simulating high frequency image detail by means of sharpening and addition of noise;

wherein the adaptive steps are executed to degree that depends on the metric of artifact visibility. This method, prior to adaptively filtering luminance, may also interpolate luminance values across block boundaries. Also, in conjunction with or after adaptively filtering luminance, chrominance may be adaptively filtered.

Another way o describing some of the methods according to the invention is as a method of reducing artifacts in an image previously processed by block transform encoding comprising the steps of:
 determining block boundaries;
 adaptively filtering luminance; and
 adaptively adjusting local saturation variation.

This method of reducing artifacts in an image previously processed by block transform encoding may further comprise the steps of sharpening of existing detail and simulating missing detail by the addition of noise. This method may also include a step of adaptively filtering luminance, and prior to adaptively filtering luminance, luminance values are interpolated across block boundaries. Additionally, after adaptively filtering luminance, chrominance may be adaptively filtered.

Another way of describing methods of reducing artifacts according to the invention is in an image previously processed by block transform encoding wherein the step of selecting a median filter window is based on an assessment of a pixel value according to a variance of a binary mask. For example, pixel value may comprise luminance texture. Still another method of reducing artifacts in an image previously processed comprises the first step of selecting a median filter window based on an assessment of a pixel value according to a variance of a binary mask.

These methods may be effected by a computer having software and hardware therein that is capable of executing and performing the method.

The term "artifact severity" relates to matching a calculated number from an image to a level of human perception. For example, one could relate the term to a metric of artifact severity that accords, at least approximately, with human perception or to mechanically readable perception. The term may also be related to an amount, because in some cases the present invention does not change the "degree" of filtering as judged by adaptive adjustment of filter parameters; instead, it simply executes a given filter for a number of times that depends on conditions in the image. This term thus includes iterative improvement methods. In one sense "iterative" means "applied more than once," although in another sense "iterative" in the image processing art means, or can mean application until some condition is satisfied. This condition is typically something like reducing an error function to below some threshold (e.g., a threshold adapted to image content) but it is normal to also place a numeric limit on the iterations to prevent infinite loops in pathological cases.

An important element of the practice of the invention is that ameliorative actions are effected in an adaptive fashion. When exactly the same modification, for example filtering, is applied to a series of images, the results may not be optimal. For example, in an image with large nearly uniform areas, noise will be very apparent and large amounts of smoothing should be applied to suppress it. In contrast, in an image containing much variation of color or lightness detail (e.g., texture) the same level of noise will not be apparent because of the so-called visual masking properties of human vision. Application of heavy smoothing to such an image to suppress noise is unnecessary and will, moreover, destroy the high spatial frequency variation of detail that is the actual information content of the image. An adaptive smoothing procedure would analyze the characteristics of the image and provide a level of smoothing appropriate to the content of the image. By use of adaptive methods it is possible, therefore, to modify an image sufficiently to improve it yet without modifying it so much as to degrade it. Additionally, it is possible to select a degree of modification that is sufficiently large as to achieve all, or substantially all, of the potential benefit available from the particular type of modification in question. Adaptive methods are required to conform to differences in characteristics between one image and another. However, it is preferred that an adaptive method also conforms to differences between one region and another within a given image. This is because the content of images varies widely. For example, an image may contain both uniform and textured regions that, as noted before in connection with two separate images, will require different treatment for optimal visual results. In general, therefore, it is desirable for adaptive methods to provide both global (i.e., image-to-image) and local (i.e., within-image) adaptation. Since the success of adaptive methods is judged perceptually, and the relationship between image properties and human perception is incompletely understood, it is difficult to design such methods. Their value, however, is proportionate to the difficulty of design and the provision of adaptive elements is, therefore, an important, valuable and desirable component in the practice of this invention.

"Adaptive" or "adaptively" means actions responsive to the actual state of affairs in the concrete image under examination as opposed to being a "one size fits all" action that is constant for all images. The import is to connect the action to the state of affairs, in other words defining the response mechanism. In the Summary of the Invention, we use the word adaptive but immediately (e.g., in the last phrase) define the response mechanism, i.e., we filter to a degree or amount that depends on a specific thing computed from the actual image data in hand—the metric of artifact visibility. The purpose of adaptively filtering something is to filter it by an appropriate amount and no more. In other words, we want to: (1) filter enough to improve but not so much as to over-filter and degrade; and (2) not under-filter, so we are able to get the full potentially available benefit of improvement by filtering. How much filtering that is to be effected will, in general, depend on: (1) the overall characteristics of the image; and (2) the local characteristics of the image.

Step 1—Determination of Image Achromaticity

In subsequent calculations, it is desirable to know whether an image is achromatic or not since effort may be saved by processing the luminance plane without processing the chrominance planes when the image is achromatic. It is also helpful to know if the image is quasi-achromatic, i.e., an image that formally contains color but is not colorful. An example of this would be a sepia tone photograph. Such an image is preferably also processed only in the luminance plane to avoid color errors. While a number of methods could be used to determine if the image is achromatic or nearly so, the following procedure is effective and is preferred. In the case of JPEG/JFIF compression, the color space is YCbCr, and for both the Cb and Cr planes, the mean value is computed. The root mean square deviation from the respective mean values of all the pixels is computed in each color plane. If the product of the two root mean square deviations is less than 20 the image is considered achromatic.

Step 2—Location of Block Boundaries

Since artifacts resulting from the visibility of distinct boundaries between transform encoding blocks are among the most obnoxious of artifacts, it is highly desirable to locate such boundaries as a preliminary to suppressing them. This may be accomplished by any known method, a number of which are already known to those skilled in the art and widely reported in literature. For example, Fourier analysis of edge histograms may be used or the procedures of European Pat. 0 884 911 or European Pat. 1 001 608 may be employed. However, the following procedure has been found to be particularly effective and is preferred. It is generally applicable, but also particularly applicable to the situation in which the block size is known but the block location is not, for example because the image has been cropped. If the image is achromatic, the block boundaries are determined from the Y channel; otherwise the boundaries are determined from the Cb and Cr channels, whose processing is identical. If the block size is known to be b by b pixels (b equaling any non-negative integer) and taking x and y as the horizontal and vertical pixel coordinates respectively, which coordinates start at (0,0), we let the value of a pixel in any channel be represented by P. A horizontal derivative image is formed by computing $P(x,y)-P(x+1, y)$ for all pixels $P(x,y)$ in the image. The columns of the derivative image are summed to form a histogram $H(x)$, which represents the distribution of horizontal edges in the image. In the case that two chrominance channels are being processed, the two chrominance channels are combined by summing their respective histograms. Following this, a series of sums is formed from the histogram, for a total of b such sums, each designated by a subscript index, according to:

$$\Sigma_1 = H(0)+H(b)+H(2b)$$

$$\Sigma_2 = H(1)+H(1+b)+H(1+2b)$$

$$\Sigma_3 = H(2)+H(2+b)+H(2+2b)$$

up to $\Sigma_b = H(b-1)+H(2b-1)+H(3b-1)$... For example, $\Sigma_1$ is the first sum (i.e. having an index of 1) and is the sum of the values of the histogram $H(x)$ at the zeroth (i.e., x=0), bth, 2bth, etc. locations of the histogram. The largest sum in the series of sums is determined and its index gives the horizontal position of the first block edge relative to the image origin at (0,0). Similarly, a vertical derivative image is formed by computing $P(x,y)-P(x,y+1)$ for all pixels $P(x,y)$ in the image. The rows of the derivative image are summed to form a histogram $V(y)$, which represents the distribution of vertical edges in the image. In the case that two chrominance channels are being processed, the two chrominance channels are combined by summing their respective histograms. Following this, a series of sums is formed from the histogram, for a total of b such sums, each designated by a subscript index, according to:

$$\Sigma_1 = V(0)+V(b)+V(2b)$$

$$\Sigma_2 = V(1)+V(1+b)+V(1+2b)$$

$$\Sigma_3 = V(2)+V(2+b)+V(2+2b)$$

up to $\Sigma_b = V(b-1)+V(2b-1)+V(3b-1)$... The largest sum in the series of sums is determined and its index gives the vertical position of the first block edge relative to the image origin at (0,0). In the case of JPEG encoding a "4:2:2" subsampling is assumed so that four luminance blocks are contained within a chrominance block.

Step 3—Derivation of Artifact Severity Metrics

Any known artifact severity metric may be used. For example, the procedures outline in WO 0022834, European Pat. 0 886 444, European Pat. 0 998 146, or M. Datcu, G. Schwarz, K. Schmidt and C. Reck, "Histogram analysis of JPEG compressed images as an aid in image deblocking", *Proc. DCC '95 Data Compress. Conf:,* 425 (1995) may be employed. It is preferred that the severity metric be particular responsive to the visibility of block edges. The following method of deriving an artifact severity metric has been found effective and is preferred. Referring to FIG. 1, which describes the situation in any given image channel, P1 denotes any block boundary pixel occupying the outermost position in a block. P2 denotes any pixel adjacent to P1 and therefore one pixel in from the boundary. P3 denotes a pixel adjacent to P2 and thus two pixels in from the boundary. Meanwhile P0 denotes any pixel adjacent to the block boundary but outside the block of interest. Pairwise differences P1–P0 and P2–P3 are computed according to left, right, top and bottom boundary positions both along rows and along columns. Corner pixels are counted twice—one along a row and once along a column. The absolute values of these differences are accumulated for each block to form the two sums:

$$A = \Sigma |P1-P0|$$

$$B = \Sigma |P2-P3|$$

Thus, for example, the sum A is formed from all possible pairwise differences between the values of pixels of type P1 and type P0 that occur in the block or immediately adjacent to the block (as shown in FIG. 1) under the constraint that the pair of pixels must be adjacent and must either be in the same row or the same column of pixels. A is a measure of discontinuity across block boundaries, while B is a measure of activity within the block but near its edges. An artifact severity metric is then computed, which comprises a numeric measure calculated from the image data that represents the severity of artifacts, and preferably the severity perceived visually by a human observer in terms of a level of image degradation. The metric may be local or global. A local metric measures the artifact severity associated with a single image block, whereas a global metric measures the overall severity of artifacts contributed by all the blocks in the image and is indicative of the degradation of the image taken as a whole. The artifact severity metric ($S_B$) for the block is given by $S_B = A/B$ and shows that block edges are most likely to be observed when blocks are relatively homogeneous near their edges and when the discrepancy between pixels at the edges of two blocks is large. Separate block artifact severity metrics are computed for each color channel. In the case of a JPEG image, each block has its own metric in the Y, the Cb and the Cr channel. Additionally, individual block metrics for a given color channel are averaged to provide a global artifact severity metric, $S_I$, for the image as a whole with respect to that channel. There are thus three global image-wide metrics, $S_I$, one for each channel reflecting, for instance, that one image is degraded primarily by visible blocks in luminance while in another the blockiness is primarily caused by chrominance or color inaccuracy at block edges.

Step 4—Suppression of Luminance Block Boundaries

Figure 2:
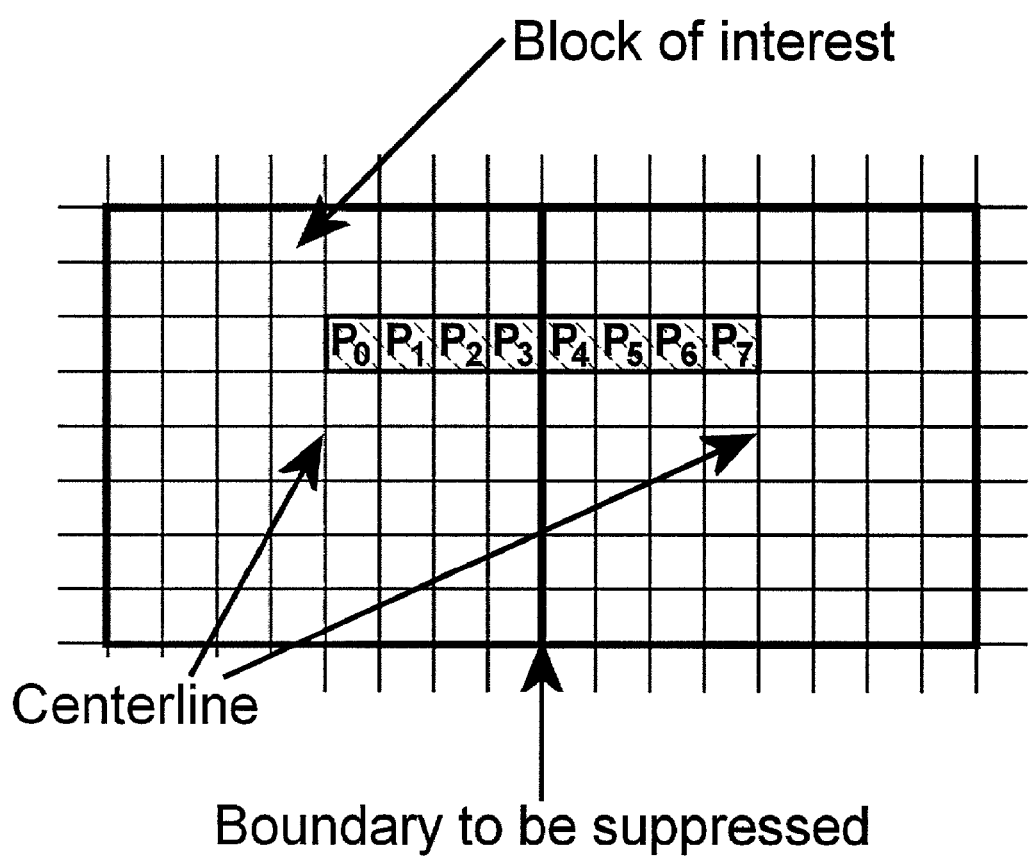
FIG. 2 shows two adjacent blocks, their boundaries and a common centerline.

The visibility of block boundaries may be suppressed by any known method, for instance by filtration or by interpolation. Examples of filtering are disclosed in U.S. Pat. No. 5,734,757, U.S. Pat. No. 5,883,983, U.S. Pat. No. 5,974,197, U.S. Pat. No. 6,167,164, European Pat. 0 808 068, European Pat. 0 886 444 and in J. Hu, N. Sinaceur, F. Li and Z. Fan, "A simplified approach to reduce compression artifacts in transform coded images", *IEEE Internat. Conf. Acoustics, Speech and Signal Processing*, 4, 2565 (1997). Examples of interpolation can be found in European Pat. 0 884 911 or G. Ramponi and S. Carrato, "Interpolation of the DC component if coded images using a rational filter", *Proc. 4th IEEE Int. Conf: Image Processing*, 1, 389 (1997). However, the following procedure has been found effective and is preferred. If the artifact severity metric, $S_B$, exceeds unity on one or other side of a block boundary, or both sides, suppression of the boundary is attempted. The procedure is described herein with respect to an 8-pixel-by-8-pixel block, but the same principle is used for any size of block. A vector of pixels is constructed from the centerline of the block of interest to the centerline of an adjacent block. This vector comprises 8 pixels, $P_i$, with luminance values $P_0, P_1, P_2, P_3, P_4, P_5, P_6$ and $P_7$, as illustrated in FIG. 2. $P_0, P_1, P_2$ and $P_3$ are members of the current block of interest, while $P_4, P_5, P_6$ and $P_7$ are members of an adjacent block. The absolute difference $|P_3 - P_4|$ is computed. If this difference does not exceed 40, luminance block boundary correction is not performed. Otherwise new pixel luminance values $P'_i$ are computed as follows:

$$P_{mean} = (P_3 + P_4)/2$$

$$P'_i = P_i - i(P_3 - P_{mean})/4 \text{ for } i=1,2,3$$

$$P'_i = P_i - (7-i)(P_4 - P_{mean})/4 \text{ for } i=4,5,6$$

Block boundaries in the chrominance planes Cb and Cr are suppressed independently as part of the color leakage suppression, which is described below.

Strictly speaking, interpolation is the creation of non-existent values (e.g. of a function) between existing values. The present invention doesn't actually do this exactly. Instead, the process creates an imaginary center point on the boundary between two block and computes replacement values for existing pixels on either side of this center point. The extent to which the pixels are modified decreases the further you move from the imaginary center point. This single step of the process has something in common with that described in European Pat. 0 884 911, except perhaps for the extra dependence on activity in this patent. The reference is quite verbose in describing the process, which is why the term "interpolation" is adopted as a kind of shorthand. However, the present step of interpolating in the method of the invention could just as well be viewed as a variant of the averaging described in European Pat. 0 886 444.

Step 5—Suppression of Luminance Artifacts

Suppression of artifacts, such as ringing or checkerboarding, may be performed with any of a range of known adaptive filters. These filters should have the characteristic of responding differently to uniform areas and to sharp edges, smoothing the former and retaining the latter. One example of an effective adaptive filter is the anisotropic diffusion filter described in U.S. Pat. No. 5,819,035. The rational filter of R. Castagno and G. Ramponi, "A rational filter for the removal of blocking artifacts in image sequences coded at low bitrate", *Proc. VIII European Signal Processing Conference EUSIPCO*, 1, 567 (1996) is especially preferred for its texture-preserving characteristics. To understand the application of a filter in the context of the invention, it is helpful to review the properties of the rational filter. The filter operates in a 3 pixel by 3 pixel window in which pixel values of a given image color channel are as follows:

| P1 | P2 | P3 |
|----|----|----|
| P4 | P5 | P6 |
| P7 | P8 | P9 |

Within this window a mean value of the color channel is computed and the variance, var, of the pixels in the window with respect to the mean is calculated. Additionally, the variance for the entire image, $var_I$, is computed relative to the mean value of the luminance channel. In order to simplify the subsequent mathematical expressions it is convenient to define a quantity q according to:

$$q = k \cdot \text{var}/(\text{var}_I + \text{var})$$

where k is an adjustable parameter. The output of the filter—in other words the new value of pixel P5—is given by the following expression:

$$Output = 0.5w(P1 + P9)/(1 + qw|P1 - P9|^4) +$$
$$0.5w(P4 + P6)/(1 + qw|P4 - P6|^4) +$$
$$0.5w(P7 + P3)/(1 + qw|P7 - P3|^4) +$$
$$P5[1 - w/(1 + qw|P1 - P9|^4) -$$
$$w/(1 + qw|P4 - P6|^4) - w/(1 + qw|P7 - P3|^4)]$$

where w is an adjustable weighting parameter. The behavior of the filter is thus controlled by the two parameters k and w. The choice of these parameters is dictated by the global image artifact severity metric $S_I$ for the channel being processed by the filter, as outlined below.

When the image was judged to be achromatic in step 1, only the luminance channel is processed with the rational filter according to the following parameter settings, where n is the number of times the filter is applied:

| $S_I$ | k | w | n |
|---|---|---|---|
| $S_I < 1.05$ | 0.05 | 0.15 | 1 |
| $1.05\ S_I < 1.25$ | 0.01 | 0.15 | 1 |
| $1.25\ S_I < 1.8$ | 0.01 | 0.15 | 2 |
| $1.8\ S_I < 3.0$ | 0.01 | 0.15 | 4 |
| $S_I\ 3.0$ | 0.0001 | 0.30 | 1 |
|  | 0.01 | 0.15 | 2 |

The last entry (following $S_I$ 3.0) denotes that the filter is first applied once with the parameters k=0.0001 and w=0.30 and then a further two times to the result of the preceding application but now with the parameters k=0.01 and w=0.15.

For an image that is not achromatic, only the luminance channel is processed with the rational filter according to the following parameters using the $S_I$ value of the luminance channel.

| $S_I$ | k | w | n |
|---|---|---|---|
| $S_I < 1.5$ | 0.01 | 0.15 | 1 |
| $1.5\ S_I < 2.5$ | 0.01 | 0.15 | 2 |
| $2.5\ S_I < 4.8$ | 0.01 | 0.15 | 3 |
| $4.8\ S_I < 17$ | 0.0001 | 0.20 | 1 |
|  | 0.01 | 0.15 | 1 |
| $S_I\ 17$ | 0.0001 | 0.30 | 1 |
|  | 0.01 | 0.15 | 2 |

Step 6—Suppression of Color Artifacts

Color channels are processed if the image is not judged to be achromatic. Color artifacts affected at this step may include, by way of non-limiting examples, visible block edges, ringing, color leakage and checkerboarding. The suppression of such artifacts is performed adaptively and independently on the Cb and Cr chrominance channels, chiefly with the aid of median filtering. However, the details of the steps vary according to the value of the image artifact severity metric $S_I$ of the relevant channel. The details are outlined below.

| $S_I$ | Processing steps |
|---|---|
| $S_I < 1.5$ | None required |
| $1.5\ S_I < 2.5$ | Conditional median filtration followed by filtering with an averaging window 3 × 3 pixels along block boundaries |
| $2.5\ S_I < 4.8$ | Median filtering with window 5 × 5 pixels |
| $4.8\ S_I < 6.5$ | Median filtering with window 7 × 7 pixels |
| $6.5\ S_I < 9.0$ | Median filtering with window 9 × 9 pixels |
| $9.0\ S_I < 14$ | Median filtering with window 11 × 11 pixels, applied twice |
| $14\ S_I < 17$ | Median filtering with window 15 × 15 pixels, applied twice |
| $S_I\ 17$ | Median filtering with window of 17 × 17 pixels or more, applied twice |

Conditional median filtration refers to a method of selecting a median filter window for the chrominance channel based on the amount of texture estimated from the luminance channel. A median filter is a filter that places a window, for instance 2 m+1 pixels wide by 2 m+1 pixels high where m is a non-negative integer, centered on each pixel of interest in turn. The values of the pixels in the window are ranked in increasing order and the median value is selected to replace the value of the central pixel. In the image processing art, texture refers to ordered or disordered local variation in color or brightness on a scale that is small compared to the size of the image or of discrete objects within the image. When used, the procedure is applied to every chrominance block within which the variance is greater than 1.2 times the variance of the entire corresponding chrominance plane of the image. For any such block, an area in the luminance channel is considered that comprises the pixels of the block in question and those of the (e.g., eight) adjacent blocks. For example, in the case of 16 pixel by 16 pixel chrominance blocks, the area of the luminance channel that is considered is 48 pixels by 48 pixels and centered on the location of the chrominance block of interest. The average luminance in the area is computed and a corresponding mask is created. In the case of the example given, the mask will be 48 pixels by 48 pixels. Mask values are assigned as follows. If the pixel of the luminance channel corresponding to the mask pixel is higher than the average luminance, the mask value is 255. Otherwise, the mask value is zero. As a result of this process, the mask contains an indication of the extent of spatial lightness or texture variation in the luminance channel. The root mean square of the mask values is then computed and used to establish the size of the median filter that will be applied to the block in question in the chrominance channel of interest. The selection is made according to the following scheme.

| Mask RMS value | Median filter window |
|---|---|
| RMS < 2 | 7 pixels by 7 pixels |
| 2 RMS < 5 | 5 pixels by 5 pixels |
| RMS 5 | 3 pixels by 3 pixels |

Whatever the means of establishing the size of the median filter window, this window is centered in turn on every pixel of the block being processed. For pixels near the edge of the block, the median filter window will, therefore, contain pixels from adjacent blocks. When averaging of boundary pixels is employed, it follows median filtration. The averaging window is centered in turn on every pixel of the block boundary and will, therefore, contain pixels from adjacent blocks. The block boundary pixels are designated as P1 in FIG. 1.

Step 7—Local Saturation Correction

The objective of this step is to restore variations in the vividness of colors that were destroyed by block transform encoding. In a chrominance color space, saturation may be measured as the distance from the luminance axis, while hue corresponds to rotation around the luminance axis. Saturation can thus be increased by translating the coordinates of the color of interest along its hue direction away from the luminance axis in a process that lengthens the saturation vector. Since desaturated colors require the most correction, one way to improve saturation is to lengthen the saturation vector only for colors that have less than maximum saturation. Preferably this is done in a nonlinear fashion, for example using a function for which the resulting saturation has a power dependence on the initial saturation. By use of a function with at least one point of inflection such as, for example, a cubic function or a sigmoidal function it is possible to enhance the saturation of relatively strongly saturated colors while somewhat desaturating very unsaturated colors. This can be helpful for reducing color errors in gray shades, to which human perception is very sensitive. A method of enhancing local differences in saturation is to shorten the saturation vector of the least saturated color in a given region of the image, while lengthening that of the most saturated color. Other colors in the region of interest may be modified between these limits, for example by linear interpolation. To the extent that the color space agrees with human visual perception, this process will enhance saturation differences while maintaining hue and lightness unchanged. It has, however, been found in the practice of the present invention that a simpler preferred procedure may be applied without significant effect on hue or lightness, which involves independent local changes of the contrast in each of the chrominance channels. The method of color contrast adjustment is conducted in one of two ways, depending on the severity of color degradation. In the case of weak color degradation for which the artifact severity metric of the channel, $S_f$, is less than 17 the following adaptive process may be used. A 5 pixel by 5 pixel window (the numbers 5×5 being exemplary, not limiting) is positioned in turn over every pixel of the chrominance channel in question. The mean value within the window, $P_{mean}$, is computed and the root mean square of the variations relative to the mean is computed as RMS. The maximum value of the RMS values of all the pixels in the color plane is saved as MaxRMS. Then, an angle θ is computed according to:

θ=20MaxRMS/RMS

The new value of the central pixel in the window, $P'_i$, is calculated from the original value $P_i$ according to:

$P'_i=(P_i-P_{mean})\tan(\theta+45)+P_{mean}$ where the argument of the tangent function (i.e., θ+45) is specified in degrees. When color degradation is severe (i.e. $S_f$ 17) the following procedure is used. A mean value of all the pixels in the color channel of interest, $C_{mean}$, is computed. Then new color values are calculated according to:

$P'_i=(P_i-C_{mean})\tan(53)+C_{mean}$

These adjustments are carried out for each of Cb and Cr.

Step 8—Simulation of High Spatial Frequency Detail

In general, higher compression levels in block transform coding lead to progressive loss of high spatial frequency detail in the image. Relatively slight losses can be restored by some form of sharpening, for example using conventional filters described in J. C. Russ, "The Image Processing Handbook", CRC Press, Boca Raton, Fla., 1995 or by specially adapted filters such as those described in G. Scognamiglio, A. Rizzi, L. Albani and G. Ramponi, "Picture enhancement in video and block-coded image sequences", IEEE Trans. Consumer Electronics, 45, 680 (1999). However, in severe degradation, the highest frequency information is entirely lost from the image. Nothing remains to be restored by sharpening and the nature of the missing information is unknown. Under these conditions, the image tends to have an artificial "plastic" look. It has been found that such images may be ameliorated by the addition of appropriate levels of noise to simulate missing high spatial frequency information. The preferred amelioration procedure includes the combination of both sharpening of existing detail and the simulation of missing detail by the addition of noise, even though they may also be used separately to some significant benefit. The following procedure is an example of a procedure within the broader scope of the invention that has been found to be effective. Sharpening is accomplished with two passes of a 5 pixel by 1 pixel filter, once oriented horizontally and once vertically. The elements of the filter kernel are, for example:

| −2 + f | −3 + f | 28 − 4f | −3 + f | −2 + f |
| --- | --- | --- | --- | --- | where f is an operator-adjustable parameter. In view of very strong and polarized preferences among different people regarding optimum image sharpness, it is preferred to provide some option for manually adjusting a preferred level of sharpness. This function is performed through the parameter f. A useful range for this parameter is from about 0 to about 2, with a preferred range of about 1.2 to about 2.0 and with a preferred default value of about 1.6. It is alternatively also possible to determine the parameter f adaptively from image information, for example, by methods described in A. Inoue and J. Tajima, NEC Res. & Develop., 35, 180 (1994), or other methods known in the art such those based on unsharp masking with noise-dependent clipping or sharpening proportional to original edge strength.

Noise is added only to the luminance channel since this is where human perception has the highest sensitivity to detail and because color noise can be both noticeable and distracting. The amount of noise may be adapted to the image, for example, by the following method. Using a 5 pixel by 5 pixel window positioned in turn over each pixel of the Y channel, the root mean square deviation, RMS, from the mean value of the window is computed. Then, at each pixel, normally distributed noise is computed in the interval−1 to +1 and multiplied by two factors, g and h. The value of g is adaptive and is derived from the RMS value calculated previously, by way of example only, according to:

| RMS | g |
| --- | --- |
| RMS 5 | 0.30 |
| 5 < RMS < 12 | 0.40 |
| 12 RMS < 25 | 0.50 |
| RMS 25 | 0.55 |

The multiplier h is a parameter similar to f that allows for different tastes in image sharpness. This is an arbitrarily selected parameter based upon operator intent. A suitable range for h is from about 0 to about 100, with a preferred range of about 0 to about 40 and with a preferred default value of about 20. Values above 0 (e.g., 0.5, 1.0, 2.0, etc.) may be used as a minimum value for each of the above ranges. In this way locally adapted noise is added to the image to simulate missing fine detail.

The image processing elements of this invention are capable of enhancing very broad categories of images that have previously undergone block transform encoding, ranging from those subjected to only slight compression to those subjected extreme levels of compression. While it is well understood by those skilled in the art that an image with extreme degradation due to compression cannot be restored to its original appearance prior to compression, the invention is nevertheless capable of significant amelioration of such images.

The invention has been described with respect to certain levels of processing adapted to the degradation of the image. These have frequently been associated with specific ranges of certain metrics. It will be understood by those skilled in the art that such levels and ranges may be modified according to the needs of the application. For example, it is possible to use the existing ranges as default ranges and then subdivide these ranges into sub-ranges associated with slight modifications of the level of processing. In this way a provision can be made for catering to different tastes regarding the appearance of images. For instance, an optimal level of processing can be automatically selected based on the specified ranges of metrics derived from the image. Then sub-ranges and associated levels of processing can be presented to the operator to allow fine tuning of the appearance of the image by small variations in relation to the automatically selected ameliorated image.

What is claimed:

1. A method of reducing artifacts in an image previously processed by block transform encoding comprising the steps of:
   determining block boundaries in the image;
   determining an approximate metric of block transform encoding artifact visibility;
   adaptively filtering luminance to a degree dependent on the metric of block transform encoding artifact visibility;
   adaptively adjusting local saturation variation to a degree dependent on the metric of block transform encoding artifact visibility; and
   adaptively simulating high spatial frequency image detail to a degree dependent on the metric of block transform encoding artifact visibility.

2. The method of claim 1 wherein prior to adaptively filtering luminance, luminance values are interpolated across block boundaries.

3. The method of claim 2 wherein in conjunction with adaptively filtering luminance, chrominance is adaptively filtered.

4. A computer having software and hardware therein that is capable of executing and performing the method of claim 2.

5. The method of claim 1 wherein in conjunction with adaptively filtering luminance, chrominance is adaptively filtered.

6. A computer having software and hardware therein that is capable of executing and performing the method of claim 1.

7. A method of reducing artifacts in an image previously processed by block transform encoding comprising the steps of:
   determining block boundaries in the image;
   determining an approximate metric of block transforming encoding artifact visibility;
   adaptively filtering luminance with a filter to a degree dependent on the metric of block transform encoding artifact visibility;
   adaptively increasing local chrominance contrast to a degree dependent on the metric of block transform encoding artifact visibility; and
   adaptively simulating high frequency image detail by sharpening and adding noise to a degree dependent on the metric of block transform encoding artifact visibility.

8. The method of claim 7 wherein prior to adaptively filtering luminance, luminance values are interpolated across block boundaries.

9. The method of claim 8 wherein after adaptively filtering luminance, chrominance is adaptively filtered.

10. A computer having software and hardware therein that is capable of executing and performing the method of claim 9.

11. The method of claim 7 wherein after adaptively filtering luminance, chrominance is adaptively filtered.

12. A computer having software and hardware therein that is capable of executing and performing the method of claim 7.

13. A method of reducing artifacts in an image previously processed by block transform encoding comprising:
   determining a block boundary in the image, the block boundary being centered around a center pixel having a chrominance value;
   selecting a median filter window based on luminance texture of pixels within the block boundary; and
   replacing the chrominance value of the center pixel with a median chrominance value of pixels within the median filter window.

14. A computer having software and hardware therein that is capable of executing and performing the method of claim 13.

15. A computer program storage medium readable by a computer system and encoding a computer program for executing a computer process that reduces artifacts in an image previously processed by block transform encoding, the computer process comprising:
   determining block boundaries in the block transform encoded image;
   determining an approximate metric of block transform encoding artifact visibility;
   adaptively filtering luminance in the block transform encoded image to a degree dependent on the metric of block transform encoding artifact visibility;
   adaptively adjusting local saturation variation in the block transform encoded image to a degree dependent on the metric of block transform encoding artifact visibility; and
   adaptively simulating high spatial frequency image detail in the block transform encoded image to a degree dependent on the metric of block transform encoding artifact visibility.

16. A computer program storage medium readable by a computer system and encoding a computer program for executing a computer process that reduces artifacts in an image previously processed by block transform encoding, the computer process comprising:
   determining block boundaries in the block transform encoded image;
   determining an approximate metric of block transform encoding artifact visibility;

adaptively filtering luminance in the block transform encoded image with a filter to a degree dependent on the metric of block transform encoding artifact visibility;

adaptively increasing local chrominance contrast in the block transform encoded image to a degree dependent on the metric of block transform encoding artifact visibility; and adaptively simulating high frequency image detail in the block transform encoded image to a degree dependent on the metric of block transform encoding artifact visibility by sharpening the block transform encoded image and adding noise to the block transform encoded image.

17. A computer program storage medium readable by a computer system and encoding a computer program for executing a computer process that reduces artifacts in an image previously processed by block transform encoding, the computer process comprising:

determining block boundaries in the block transform encoded image;

adaptively filtering luminance within the block boundaries of the block transform encoded image; and adaptively adjusting local saturation variation within the block boundaries of the block transform encoded image.

18. A computer program storage medium readable by a computer system and encoding a computer program for executing a computer process that reduces artifacts in an image previously processed by block transform encoding, the computer process comprising:

determining a block boundary in the image, the block boundary being centered around a center pixel having a chrominance value;

selecting a median filter window based on luminance texture of pixels within the block boundary; and replacing the chrominance value of the center pixel with a median chrominance value of pixels within the median filter window.

* * * * *

UNITED STATES PATENT AND TRADEMARK OFFICE
CERTIFICATE OF CORRECTION

PATENT NO.         : 7,003,174 B2                                              Page 1 of 1
APPLICATION NO. : 09/897765
DATED              : February 21, 2006
INVENTOR(S)        : Sergei Nikolaevich Kryukof It is certified that error appears in the above-identified patent and that said Letters Patent is hereby corrected as shown below:

Column 1, line 1, delete "Sergei Nikolacevich Kryukof" and insert --Sergei Nikolaevich Kryukof-- therefor.

Column 1, line 4, delete "Kryzstof Antoni Zaklika" and insert --Krzysztof Antoni Zaklika-- therefor.

Column 10, line 57, delete "Conf:," and insert --Conf.,-- therefor.

Signed and Sealed this

Twenty-fourth Day of November, 2009

David J. Kappos
*Director of the United States Patent and Trademark Office*